United States Patent
Sama

[15] 3,656,626
[45] Apr. 18, 1972

[54] FILTERING MATERIAL

[72] Inventor: Nicholas Sama, 4940 Southwest 95th Avenue, Miami, Fla. 33156

[22] Filed: Sept. 14, 1970

[21] Appl. No.: 72,128

[52] U.S. Cl. .................................................. 210/282
[51] Int. Cl. ...................................................... B01d 23/10
[58] Field of Search .................................. 210/266, 282, 496

[56] References Cited

UNITED STATES PATENTS

| | | | |
|---|---|---|---|
| 1,367,324 | 2/1921 | Probst | 210/266 |
| 1,558,608 | 10/1925 | Hilbish | 210/266 |
| 2,203,495 | 6/1940 | Kamrath | 210/496 X |

Primary Examiner—Samih N. Zaharna
Attorney—John Cyril Malloy

[57] ABSTRACT

A filtering device for use in spanning relation of the filter flow path of a liquid which includes a container having an upstream and a downstream screen means, and a bed of shredded pieces of open-celled material, such as polyurethane foam, captivated in the container so that the liquid to be filtered is constrained to flow through the bed.

2 Claims, No Drawings

FILTERING MATERIAL

This invention relates to an improved filtering material combination.

Filtering techniques, especially as applied to swimming pools, have generally fallen into two categories. The first is the passing of the water to be filtered through a bed of granulated material, usually sand. While the spacing between the granules in such an arrangement is usually considerably larger than the particles which must be filtered out for clear water to result, the disposal of a deep bed of filtering granules results in an eventual trapping of these fine particles somewhere in the structure. In this first category there also belongs the disposal of open-celled materials in block or slab form, such as polyurethane foam, to effect the filtration. The major shortcoming of this method is that the portion of the filtering bed adjacent the input into the filter becomes clogged long before the rest of the bed, the amount of dirt entrapped in any given portion being progressively less as one moves downstream through the bed. Thus, when the entrance portion has effectively shut down the flow through the filter, the major portion of the aggregate is in a relatively clean condition, since each portion has served only the purpose of removing what upstream portions have passed. This preferential operation has the effect of wasting room, so that large aggregate volumes are required for filtration over a given length of time.

The second method is based on interposing what is essentially a membrane between the input and output of the filter. This usually is effected in terms of a canvas or nylon sheet suitably supported, and having a very fine weave. This tightly woven cloth is backed-up by a diatomaceous earth layer on the upstream side of the cloth, which serves the purpose of making even finer the passage apertures through the composite membrane, and which, more importantly, prevents calcification of the cloth portion. This calcification, if it were permitted to occur, would quickly shut down or close the openings in the woven cloth and render it permanently useless. The disadvantage in this second method, and it is a very serious one, is, that being essentially a single-impact (very thin) device, the membrane requires very small pores. These will naturally clog very quickly, and the effort to offset this by presenting a large frontal membrane area has resulted in all sorts of strange devices. Among the most common are the accordian-pleat and spiral vanes. Needless to say, the results are not too good, and filters of this type are notorious for the high frequency of cleanings required.

An object of this invention is to provide an improved filtering combination which includes a media of shredded open-celled material, such as polyurethane foam, arranged in a screen container and positioned so as to span the flow path.

It is another object of this invention to provide an improved filter combination which is particularly useful in filtering water flowing through a filtering means, such as in a swimming pool.

The proposed improvement is as follows. A filtering volume, enclosed in a suitably constructed canister, is filled with shredded open-celled material, such as polyurethane foam. The packing of this shredded or minced material is to be regulated such that the spacing between shreds is very much larger than the spacing of the cells or pores in the shreds. For example, with foam having cell-spacings of a few thousandths of an inch, and a shred size of about one-quarter inch, a fair squeezing together of the shredded mass can be used to give a spacing between shreds of about one-twentieth inch.

In order that the shredded foam be not swept away by the flow, it being very light, a suitably constructed canister will desirably be provided with screens over input and output surfaces, such screens having openings of about one-twentieth inch.

Consider now the operation of the proposed improvement. The spaces between the fine-pored shreds, being relatively large, serve as communicating passageways, and will do very little filtering precisely because they are large. Each porus shred, however, finds itself in a fluid stream with necessarily different pressures between upstream and downstream sides. This causes liquid to flow through the shred pores, and here the filtering is accomplished. In effect, then, what results is a very large number of tiny filters, interconnected both in series and in parallel arrangement by the spacing between them. It is recognized that with this arrangement, filtration occurs quite rapidly, and that no special fabricating techniques or materials are required. In fact, one of the most useful aspects of this proposed improvement is that it utilizes what is considered a waste product, shredded foam.

The arrangement proposed, in which each shred becomes a separate filter interconnected with thousands of others, results in a very economical use of filtering volumes. The resulting "-bed", as evidenced by examination of operating models, becomes dirty in a very uniform way, as would be expected from the description. Thus, very little space is wasted.

For comparison purposes, the following is noted. Over the past 2 ½ years, observation of the same unit, utilizing the same filtering volume, has yielded cleaning times of 4–6 weeks with a gravel-and-sand mix, 2–3 weeks for a canvas and diatomaceous earth combination, and a minimum of 6 months with a shredded polyurethane fill. There actually has not been enough time to determine the full useful life of the proposed arrangement, but it is fairly clear from observations that a well designed filter of no more than 3 cubic feet volume, and utilizing the method here proposed, will maintain a 20,000 gallon pool in sparkling condition for at least 6 months.

While the instant invention is described in an embodiment, presently conceived as being a preferred embodiment, it is recognized that various changes and modification may be made without departing from the spirit and scope of the invention.

What is claimed is:

1. For use in spanning relation of a filter flow path for liquids having particulate matter to be filtered from the flow,
    a container having an upstream and a downstream screen means for flow into and out of the container,
    a bed of pieces of open-celled porous material captivated in the container so that the liquid to be filtered is constrained to flow through the bed,
    said pieces being packed in said container and each piece having an exterior surface in random engagement with the surface of adjacent pieces, such that a spacing results between said pieces which provides by-passes around the pieces for the liquid at all cross sections for a flow component to be filtered at downstream sections, the total area of the spacing between the pieces summed over any cross-section providing an operating pressure drop between said screen means such that the bed will not collapse in use,
    the cell openings of the pieces being sized for flow of a component of the liquid flow through the pieces at each cross-section and to trap said particulate matter in the cells
    the by-passes and the cell openings at each cross section providing alternate paths for the flow so that by-passing components of flow are filtered at downstream sections upon successive opportunities for flow through the pieces at downstream sections, the material of said pieces being of sufficient rigidity so as to maintain the cell openings and the spacing between the pieces substantially constant during the filtering operation,
    whereby the particulate matter is trapped and effectively removed from the liquid flow along the length of the bed between the screen means, the removed matter being distributed over the length of the bed.

2. The combination as set forth in claim 1 wherein the path through the pores is in the order of between 0.001 and 0.010 inches and the spacing between the pieces is in the order of about 0.050 inches.

* * * * *